Nov. 3, 1942.　　　　M. LIWSCHITZ　　　　2,300,947
SHIP PROPULSION SYSTEM
Filed Aug. 22, 1941　　　2 Sheets-Sheet 1

WITNESSES:

INVENTOR
Michael Liwschitz.
BY
Paul E. Friedemann
ATTORNEY

Nov. 3, 1942.   M. LIWSCHITZ   2,300,947
SHIP PROPULSION SYSTEM
Filed Aug. 22, 1941   2 Sheets-Sheet 2

WITNESSES:

INVENTOR
Michael Liwschitz.
BY
ATTORNEY

Patented Nov. 3, 1942

2,300,947

UNITED STATES PATENT OFFICE 2,300,947

SHIP PROPULSION SYSTEM

Michael Liwschitz, Wilkinsburg, Pa., assignor to Westinghouse Electric & Manufacturing Company, East Pittsburgh, Pa., a corporation of Pennsylvania Application August 22, 1941, Serial No. 407,937

10 Claims. (Cl. 172—8)

My invention relates to ship propulsion systems and more particularly to electric ship propulsion systems utilizing a plurality of generators and prime movers therefor, in which systems all the generators are arranged to supply energy, either in combination or singly, to one or any one of each of the single synchronous motors coupled to drive a ship propeller.

This use of a plurality of generators and a plurality of prime movers is found most often where the ship is Diesel engine driven. At full speed all generators are used, whereas at lower speeds only one, or some, of the whole group is used. Thus for increasing the speed it is necessary to connect the idle generators to those running.

To effect this change connection without disturbing the system, consisting of two or more generators and the propeller motor, or motors, as the case may be, by high current surges, different proposals have in the past been made: By one proposal the new generator is caused to synchronize by means of the use of elaborate and expensive synchronizing equipment, whereas, by another proposal a reactor is connected between the generator to be added to the system and the system to reduce the current surges while switching. In both cases special devices are necessary to effect the addition of a generator to the system.

It is a broad object of my invention to provide for the addition of one or more generators to a ship propulsion system of the type mentioned without using any special synchronizing equipment.

Figure 1:
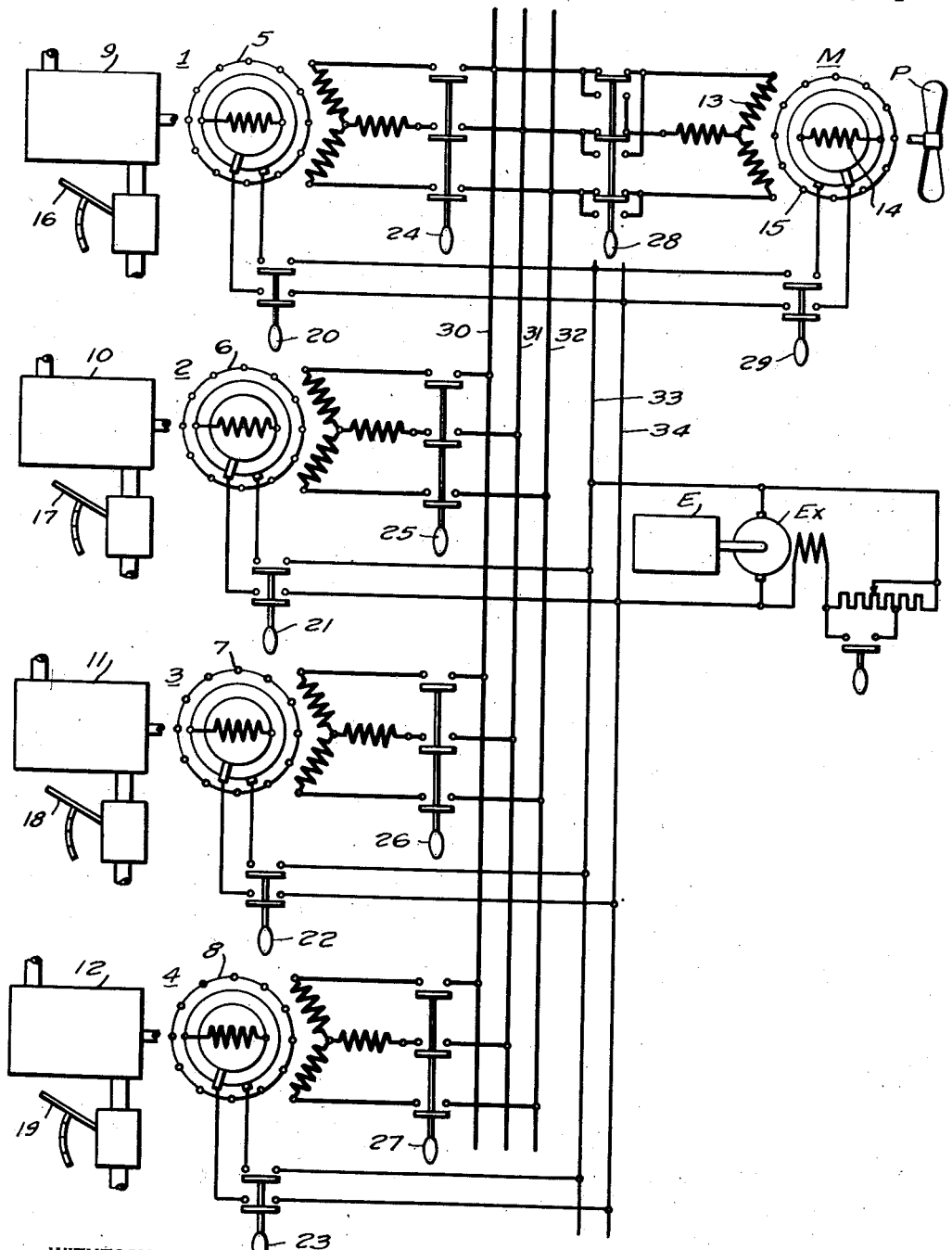
Figure 2:
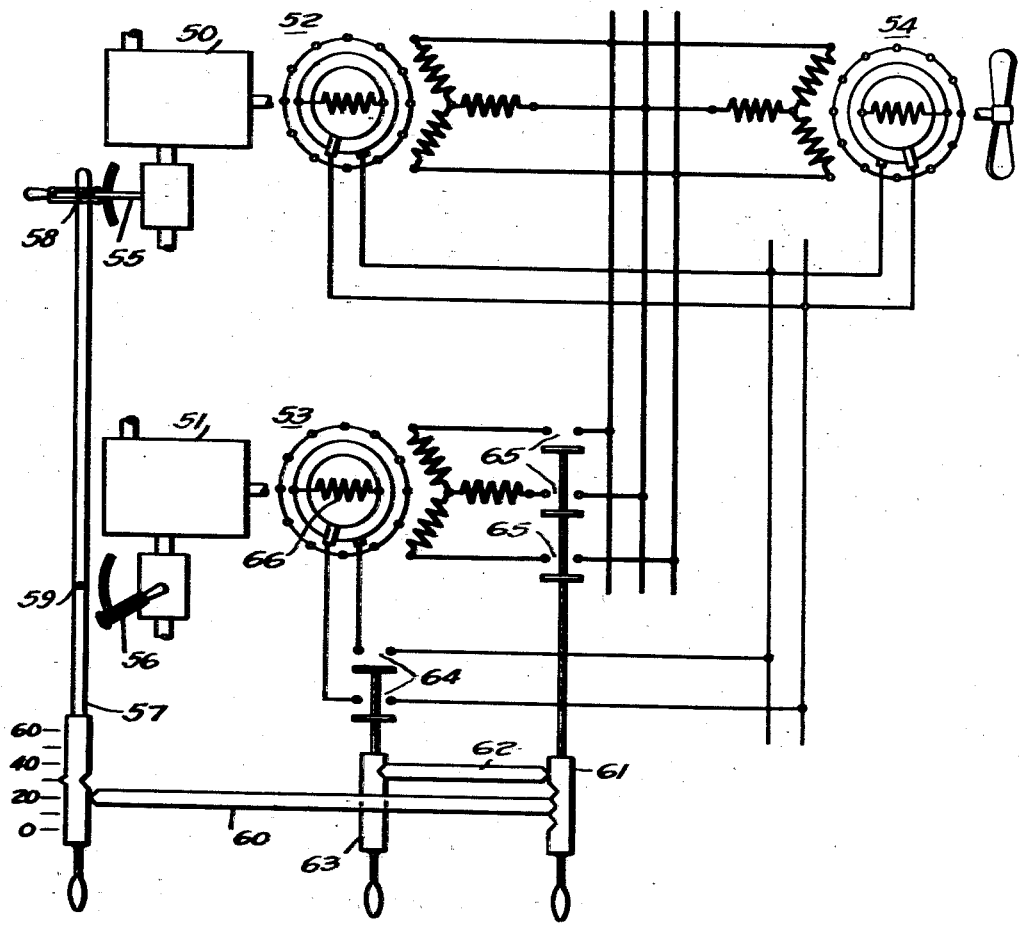

Other objects and advantages will become more apparent from a study of the following specification when studied in conjunction with the drawings accompanying the specification, in which:

Figure 1 is a diagrammatic showing of a ship propulsion system embodying my invention; and Fig. 2 is also a diagrammatic showing of my invention in its more automatic form.

With my system I utilize a plurality of generators as 1, 2, 3, and 4 all provided with proper damper windings, as 5, 6, 7 and 8, respectively, so that the generators may be started as conventional synchronous motors by first accelerating them as induction motors and then by applying excitation, synchronize them to thus operate them as conventional synchronous motors.

Each generator is driven by its own prime mover as a Diesel engine or turbine. The Diesel engines shown are designated, respectively by reference characters 9, 10, 11 and 12. The single motor M, for driving the propeller P is of the synchronous type having a stator winding 13, a field winding 14 and a starting or damper winding 15. A constant voltage exciter Ex, driven by a suitable engine E, provides the excitation for all the generators and all the motors, if there be more than one propeller.

It is well known that the power required to drive a ship through the water rises with a higher power of the speed, possibly the cube of the speed. This means that, if the ship is driven at half of its full speed or some lower speed, one generator of a group of four, as I have shown, will suffice to operate the ship at such half speed, or lower speed. The propeller driving motor, to effect full speed operation when desired, will thus have approximately four times the capacity of any one generator.

Let the assumption be that the speed lever 16 is in the half speed position and that switches 20, 24, 28 and 29 are closed, and that the exciter Ex is supplying normal constant voltage to buses 33 and 34. Under these conditions generator 1 will supply buses 30, 31 and 32 with energy at half normal frequency and full voltage for that frequency. The motor M will thus drive the propeller at half speed. Only part of the capacity of the motor is thus used but generator 1 will be fully loaded.

In practicing my invention to add a generator to the system the procedure is as follows:

The speed lever 16 is first moved from the half speed position to a lower speed position, say one third of normal full speed. The lower speed selected will depend somewhat on the speed at which the propeller P drives motor M as a synchronous generator when the speed of engine 9 is thus reduced. The preferred lower speed selected for engine 9 is such that there will be no great tendency for generator 1 to supply energy to buses 30, 31 and 32 at a frequency other than the frequency of the energy being now supplied to buses 30, 31, and 32 by the motor M now operating as a generator.

Generator 1 and motor M, now a generator, thus remain in synchronism. Further the capacity of buses 30, 31, and 32 is now five times the original capacity. This means that synchronization of any one of the other generators with the supply at this time on buses 30, 31, and 32, though such synchronization should cause the machine, or generator, to be added to draw as high as four times its normal load current, is not likely to disturb the system nor cause a failure to synchronize.

For synchronous motors now in general use the current inrush at synchronization when operating near synchronous speed is no more than about two and a half of its normal load current. It is thus apparent that there is ample capacity on buses 30, 31, and 32 to synchronize, say, generator 2 as a synchronous motor even under rather bad synchronizing conditions.

To expedite adding the generator 2 to the system engine 10 will, of course, be in operation and speed levers 16 and 17 will be moved, substantially at the same time, to corresponding lower speed positions. Engines 9 and 10 will thus operate nearly at the same speed.

Switch 25 is now operated to connect generator 2 to buses 30, 31, and 32. This generator thus starts on its damper winding 6 as a conventional synchronous motor and accelerates to its normal induction motor balancing speed. Since the engine 10 by reason of the adjustment of lever 17 attempts to operate at substantially this same balancing induction motor speed, thus producing no load on machine 2, speed, no difficulty is encountered in obtaining a balancing induction motor speed of say 97% to 98% of synchronous speed, or even synchronous speed.

At the balancing induction motor speed switch 21 is operated. The field of machine 2 is thus excited and machine 2 is synchronized as a synchronous motor. Speed levers 16 and 17 are now moved in unison to the desired speed for the ship and both generators 1 and 2 supply energy to motor M.

When machine 3 is to be added speed levers 16, 17, and 18 are moved to substantially the same lower speed; machine 3 is started as an induction motor on its damper winding 7 by closing switch 26; at the balancing induction motor speed machine switch 22 is closed and machine 3 is synchronized as a synchronous motor; and then speed levers 16, 17, and 18 are moved in unison to the desired speed. While machine 3 is added the capacity of buses 30, 31, and 32 is six times the capacity of one generator.

When machine 4 is to be added speed levers 16, 17, 18, and 19 are moved to corresponding lower speed positions; machine 4 is started as an induction motor on its damper winding 8 by the closing of switch 27; at the balancing induction motor speed of machine 4 switch 23 is closed to synchronize machine 4 as a synchronous motor; and then speed levers 16, 17, 18, and 19 are moved to the ship speed desired. During the addition of machine 4 the capacity of buses 30, 31, and 32 is seven times the capacity of one generator. The system may, of course, involve still more generators, however the theory of my invention would be clear from a showing of but two generators and one motor.

In the actual installation on board ship the control is effected more automatically than shown in Fig. 1. I show the automatic control in Fig. 2 which, of course, for purposes of clarity, shows only the essentials for illustrating my invention without showing a complete ship propulsion control.

In Fig. 2 if the generator 53 is to be added to the system including the engines 50 and 51 and the generators 52 and 53 and motor 54, connected to the generator 52 as shown, and operating at half speed, the speed levers 55 and 56 are first latched to the main speed lever 57 at points 58 and 59. The main speed lever 57 is then moved from its original half speed position to, say, the twenty cycle position. In this position the interlock 60 between lever 57 and switch lever 61, releases the switch lever 61. This switch lever 61 is now operated to start machine 53 as an induction motor. By the operation of switch lever 61 the interlock 62 between this lever 61 and the field switch lever 63 is released. Field switch lever is thus freed for movement to synchronize the machine 53. At the proper speed of machine 53 the machine is synchronized by closing switches 64 by means of the field switch lever to apply excitation to machine 53.

Since the speed lever 57 is free to be moved after synchronization of machine 53, the speed of both engines 50 and 51 is increased to the speed desired. Both machines 52 and 53 now operate as generators to supply energy to the motor 54.

It should be noted that the interlocking shown prevents improper opening of switches 65 without first removing the excitation from field 66 by the opening of switches 64.

For instance, my scheme of adding generators to an alternating current system may readily include the use of a synchronous condenser adapted to be temporarily connected to an operating inertia load so as to drive the synchronous condenser as a generator to increase the capacity of the system, reducing the frequency of the system to match the frequency of the synchronous condenser, and then forcibly, without special synchronizing devices, synchronize other alternators, operating as synchronous motors, with the system, then again load the system.

It is to be understood that my invention is not limited to the specific embodiments illustrated but is to be limited only by the appended claims.

I claim as my invention:

1. In an electric ship propulsion system including a synchronous motor coupled to drive a ship propeller, in combination, an alternator of lesser capacity than the synchronous motor, provided with a field winding, a stator winding, and a relatively heavy damper winding designed that the alternator may, when desired, be started as an induction motor and then synchronized substantially as a conventional synchronous motor, said alternator being connected to the synchronous motor to operate it, a prime mover for operating the alternator, means for varying the speed of the prime mover, said means for varying the speed of the prime mover being adjusted to operate the alternator at such a selected speed, less than full speed, that the alternator operates at full capacity but the synchronous motor, being of a greater capacity than the alternator, operates at less than full capacity, a second alternator, prime mover, and means for adjusting the speed of the second prime mover all similar to the first alternator, prime mover and speed adjusting means therefor, means acting on both speed adjusting means for simultaneously adjusting the speed of both prime movers to a speed less than said selected speed, whereby the synchronous motor is unloaded and operated as a generator by the propeller, and whereby the first alternator is unloaded, switching means for connecting the stator winding of the second alternator to the interconnection between the first alternator and the synchronous motor, now operating as a generator to thus accelerate the second alternator as an induction motor, and means operable after the operation of the switching means for exciting the field winding of the second alternator to synchronize the second alternator substantially as a conventional synchronous motor, whereupon the speed of both prime movers may be increased to thus supply energy to said synchronous motor from both alternators.

2. In an electric ship propulsion system including a propeller, a synchronous motor for driving the propeller, a plurality of generators for supplying energy, either singly or in combination, to the synchronous motor, a prime mover for each generator, and means for each prime mover for adjusting the speed of each prime mover, in combination, means for connecting one generator to said synchronous motor, said speed adjusting means for the prime mover operating the generator connected to the synchronous motor being adjusted to a speed to fully load said connected generator but to thus operate the synchronous motor partially loaded, control means for simultaneously adjusting the speed adjusting means for the prime mover of the connected generator and the prime mover of another generator to a lower selected speed to thus unload the connected generator and cause generator operation of the synchronous motor by the propeller, said other generator having relatively heavy damper windings so that it can when desired be started as a conventional synchronous motor, means for connecting the other generator to the synchronous motor whereby the said other generator is accelerated as an induction motor, and means for synchronizing the other generator to operate as a synchronous motor by supplying it with excitation, said control means being operable to increase the speed of both generators so as to load them both as generators.

3. In an electric ship propulsion system including a propeller, a synchronous motor for driving the propeller, a plurality of generators for supplying energy, either singly or in combination, to the synchronous motor, a prime mover for each generator, and means for each prime mover for adjusting the speed of each prime mover, in combination, means for connecting one generator to said synchronous motor, said speed adjusting means for the prime mover operating the generator connected to the synchronous motor being adjusted to a speed to fully load said connected generator but to thus operate the synchronous motor partially loaded, control means for simultaneously adjusting the speed adjusting means for the prime mover of the connected generator and the prime mover of another generator to a lower selected speed to thus unload the connected generator and cause generator operation of the synchronous motor by the propeller, said other generator having relatively heavy damper windings so that it can when desired be started as a conventional synchronous motor, means for connecting the other generator to the synchronous motor whereby the said other generator is accelerated as an induction motor.

4. In a control for a power system including a source of power, a synchronous motor operating an inertia load at a given speed while connected to be supplied from said source of power having a given capacity and frequency, in combination, means for decreasing to a selected frequency the frequency of the source of power whereby the inertia load will drive the synchronous motor as a synchronous generator, an alternator having a damper winding of sufficient capacity so that the alternator may be started substantially like a conventional synchronous motor, control means for operating the alternator at or near the said selected frequency, means for connecting the alternator to the source of supply whereby it will operate as an induction motor at or near the said selected frequency, and means for changing the induction motor operation to synchronous motor operation.

5. In a control for a power system including a source of power, a synchronous motor operating an inertia load at a given speed while connected to be supplied from said source of power having a given capacity and frequency, in combination, means for decreasing to a selected frequency the frequency of the source of power whereby the inertia load will drive the synchronous motor as a synchronous generator, an alternator having a damper winding of sufficient capacity so that the alternator may be started substantially like a conventional synchronous motor, control means for operating the alternator at or near the said selected frequency, means for connecting the alternator to the source of supply whereby it will operate as an induction motor at or near the said selected frequency, means for changing the induction motor operation to synchronous motor operation and means for simultaneously changing the frequency of the source of power and the generator to thus increase the capacity of the supply for the synchronous motor to thus drive the inertia load.

6. In a control for a power system including a source of alternating current energy, a synchronous motor driving an inertia load at a selected speed, in combination, an alternator having an armature winding, a damper winding, and a field winding, means for decreasing the frequency of the source of alternating current just sufficiently that the synchronous motor decreases in speed sufficiently so that its inertia load operates the synchronous motor as a synchronous generator at no load and at the decreased frequency of the source of alternating current whereby the capacity of the power system is increased by the generating capacity of the synchronous motor, means for connecting the armature winding of the alternator to the system, to operate it as an induction motor, means for exciting the field winding of the alternator to synchronize it as a conventional synchronous motor, and means for increasing in unison the frequency of the alternator and source of supply to load the system by again driving the synchronous motor as a load.

7. In a control for a power system including a source of alternating current energy, a synchronous motor driving an inertia load at a selected speed, in combination, an alternator having an armature winding, a damper winding, and a field winding, means for decreasing the frequency of the source of alternating current just sufficiently that the synchronous motor decreases in speed sufficiently so that its inertia load operates the synchronous motor as a synchronous generator at no load and at the decreased frequency of the source of alternating current whereby the capacity of the power system is increased by the generating capacity of the synchronous motor, means for connecting the armature winding of the alternator to the system, to operate it as an induction motor, means for exciting the field winding of the alternator to synchronize it as a conventional synchronous motor.

8. In a control for a power system including; a source of alternating current energy; an inertia load; a synchronous motor, mechanically coupled to said inertia load, connected to said source of alternating current to thus drive said inertia load, in combination with, an alternator disposed to be connected to said source of alternating current; means for varying the frequency of the source of alternating current, said means being operable to decrease the frequency of the alternating current of the source by an amount just sufficient so that the inertia load operates the synchronous motor as a generator at no load whereby the capacity of the system is increased by the capacity of the synchronous motor; and means for connecting said alternator to the system, whereby the combined capacity of the source of alternating current and the synchronous motor forces rapid synchronization of the alternator thus connected to the system.

9. In a control for a power system including, a source of supply of alternating current; a synchronous motor, having a large power capacity relative to the power capacity of the source of supply, connected to said source of supply; an inertia load mechanically coupled to the synchronous motor to be driven thereby, in combination with, an alternator of substantially conventional design disposed to be connected to the power system to enhance the power capacity of the power system; means for varying the frequency of the supply of alternating current, said last named means being operable to decrease the frequency of the alternating current of the power system just sufficient so that said synchronous motor is driven by the inertia load as an alternator at no load to thus increase the power capacity of the power system by the generating capacity of the synchronous motor, and means for connecting said alternator to the power system, whereby the combined capacity of the source of alternating current and the synchronous motor operating as a generator forces rapid synchronization of alternator thus connected to the system.

10. In a control for a ship propulsion system, in combination, a source of alternating current, a synchronous motor connected thereto, a ship propeller coupled to the synchronous motor to be normally driven by said motor, the power capacity of said synchronous motor being large relative to the power capacity of said source of alternating current, an alternating current generator of substantially conventional design disposed to be connected to the source of supply and the synchronous motor to thus aid in the propulsion of the ship, means for varying the frequency of the alternating current of the said source of alternating current, said last-named means being operable to decrease the frequency of said source by an amount just sufficient to cause the ship propeller to drive the synchronous motor as a generator at no load, means for connecting the armature winding of the said alternator to the synchronous motor and the said source, whereby the combined capacity of said source and said synchronous motor forces rapid speed stabilization of said alternator operating as an induction motor, and means for exciting said alternator to thus synchronize said alternator as a synchronous motor.

MICHAEL LIWSCHITZ.